United States Patent [19]
Edstrom et al.

[11] 3,988,928
[45] Nov. 2, 1976

[54] DEVICE FOR MEASURING AND/OR MONITORING THE FLOW VELOCITY OF A FLOWING FLUID

[75] Inventors: Lennart Edstrom; Kent Uddin, both of Lulea, Sweden

[73] Assignee: AB Elektronik-Konstruktioner, Lulea, Sweden

[22] Filed: Nov. 26, 1974

[21] Appl. No.: 527,342

[30] Foreign Application Priority Data
Dec. 3, 1973 Sweden .............................. 7314197

[52] U.S. Cl. .................................................. 73/204
[51] Int. Cl.² ............................................. G01F 1/68
[58] Field of Search ........................... 73/204, 239 R

[56] References Cited
UNITED STATES PATENTS

| | | | |
|---|---|---|---|
| 2,648,224 | 8/1953 | Phillips et al. | 73/204 |
| 2,696,739 | 12/1954 | Endres | 73/362 |
| 3,400,582 | 9/1968 | Warner | 73/204 |
| 3,680,377 | 8/1972 | Lightner | 73/204 |
| 3,733,897 | 5/1973 | Herzl | 73/204 |
| 3,780,585 | 12/1973 | Milo | 73/362 |
| 3,815,113 | 6/1974 | Welch | 340/233 |
| 3,882,728 | 5/1975 | Wittlinger | 73/362 |

FOREIGN PATENTS OR APPLICATIONS

| | | | |
|---|---|---|---|
| 1,098,077 | 11/1968 | United Kingdom | 73/204 |
| 1,121,129 | 7/1968 | United Kingdom | 73/204 |

*Primary Examiner*—Herbert Goldstein
*Attorney, Agent, or Firm*—Flynn & Frishauf

[57] ABSTRACT

A device for monitoring and/or measuring the flow velocity of a flowing fluid comprises temperature sensing means adapted for location in said flowing fluid. The sensing means comprises two identical monolithic semiconductive crystals (integrated circuits) each arranged in a heat conducting case. Each crystal contains a number of series connected diode paths serving as temperature sensors. One of the crystals in addition includes a heating member, such as a semiconductor device having a diode, transistor or Zener diode characteristic with a low temperature coefficient. A constant voltage is supplied to said heating member thereby developing constant power, and thus a constant temperature rise, in said one crystal over a large temperature range. Means are arranged for supplying current in the forward direction in the two diode paths, and a comparison circuit is connected to the diode paths for comparing the currents therein, whereby the flow velocity may be determined.

10 Claims, 3 Drawing Figures

DEVICE FOR MEASURING AND/OR MONITORING THE FLOW VELOCITY OF A FLOWING FLUID

The present invention relates to a device for measuring and/or monitoring the flow velocity of a flowing fluid, comprising temperature sensing means adapted for location in said flowing fluid, and means for supplying constant power to said sensing means so as to obtain a constant temperature excess therein relative to ambient temperature, whereby a temperature reduction in said sensing means caused by said flowing fluid will be related to said flow velocity.

In process installations and the like, it is frequently desirable to be able to set a flow indicator, so that it causes an alarm if a fluid flow is reduced a certain percentage below the nominal flow, for which purpose a percentage scale is preferable and easily understandable for most persons. In addition, a measuring equipment should be provided, which indicates actual flow in m/s, which is not included in most prior installations.

Previously known electronic devices for monitoring the flow velocity of a flowing fluid often have the disadvantage of not being designed for continuous operation but only for relatively short intervals between calibrations. Alternatively, they are temperature dependent to a great extent.

It is previously known to utilize a measuring device for measuring the flow velocity of gases and liquids, which comprises a thin resistance wire, electrically heated and disposed in a flowing fluid, the electric resistance of the wire at constant current supply through the wire having certain relation to the velocity of the fluid. It is also known that if the power is maintained constant in a heated resistive sensor, the temperature reduction will be dependent on the flow velocity of the fluid. A second sensor located in the fluid may be used as a reference with respect to the ambient temperature. Measuring devices known up to the present and operating according to this principle have been difficult to realize in practice, except for laboratory use, and are not well suited for continuous operation. A reason is that it is difficult to isolate the second reference sensor from the influence of the flowing fluid, which makes it difficult to obtain a correct measuring value at varying ambient temperatures. Another reason is that it is difficult to obtain two sensors having the same time constant, a difference in this respect causing erroneous values and a false alarm due to varying temperatures in the flowing fluid. In addition, it is difficult to maintain the supplied power constant, since both power and voltage vary with the use of the electric resistance wire, the compensation of this variation requiring complicated electronic control techniques.

The object of the present invention is to eliminate disadvantages of the kind mentioned above in previously known flow measuring devices and especially to provide a simplified device, which also meets the requirements indicated above.

SUMMARY OF THE INVENTION

This object has been achieved by the device according to the invention which is characterized in that the sensing means comprises two essentially identical monolithic semi-conductive crystals arranged in a heat conducting case each and containing a number of series connected diode paths serving as temperature sensors, one of said crystals in addition including a heating member with a low temperature coefficient, said constant power supplying means being arranged to supply a constant voltage to said heating member and thereby developing constant power in said one crystal over a large temperature range, means for supplying current in the forward direction in said two diode paths, a comparison circuit being connected to said diode paths for comparing the currents therein and thereby determining the flow velocity.

BRIEF DESCRIPTION OF THE DRAWINGS

An embodiment of the flow measuring and monitoring device according to the present invention shall now be described more closely below with reference to the attached drawing, in which.

DETAILED DESCRIPTION OF ILLUSTRATED EMBODIMENT

Figure 1:
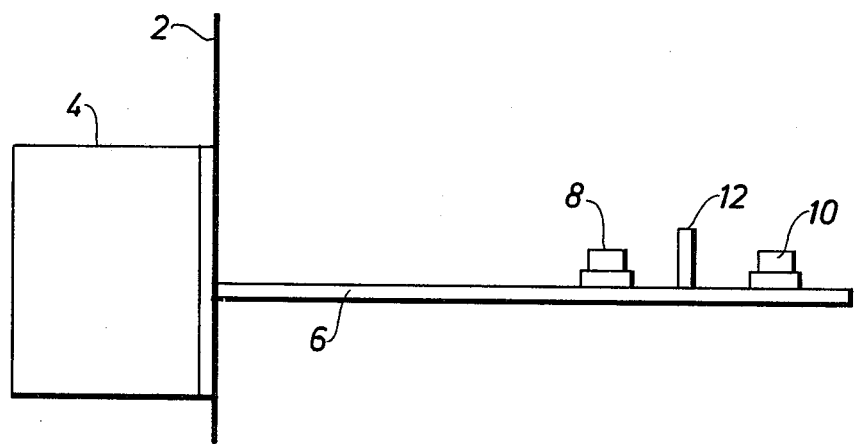
FIG. 1 schematically illustrates the device as mounted in a channel for a flowing fluid.

In FIG. 1 the reference numeral 2 indicates a wall of a channel for a flowing fluid. The flow measuring or monitoring device according to the invention comprises two main portions, viz. an electronic amplifier and alarm unit 4 and a sheet 6 on which two temperature sensors 8 and 10 are mounted. The unit 4 is mounted at the external side of the channel wall 2 and the sheet 6 with the two sensors 8 and 10 extends into the channel transversally of the flow direction of the fluid in the channel, with the plane of the sheet extending in parallel to the flow direction. A radiation shield 12 is mounted on the sheet 6 between the sensors 8 and 10. The sheet 6 comprises a printed board assembly including a portion of the circuit illustrated in FIG. 3, of which the temperature sensors 8 and 10 form part.

The device according to the invention is generally based on the principle described above, which is known per se and according to which constant power is supplied to the temperature measuring member in order to provide a constant excess temperature relative to the environment. In the present case, the sensor 10 is supplied with constant power so that a constant excess temperature is obtained relative the environment. The other sensor 8 is identical to the one heated including a heating member not connected to a source of power, and serves as a reference to the ambient temperature.

When these two sensors are not exposed to a flowing fluid, they will assume a mutual relationship, which is constant and independent of the ambient temperature. Contrary, when the sensors are exposed to a flowing fluid, the heated sensor 10 will be cooled in relation to the velocity of the flowing fluid. Thereby the mutual relationship between the temperature sensors will also be changed in proportion to the velocity of the flowing fluid.

Each sensor comprises a number, e.g. four, completely separated, bipolar transistors, which are integrated on the same silicon wafer and encapsulated in a steel case each. As a temperature dependent means in the respective sensors, the base-emitter diodes, connected in series, of three of the transistors can be utilized. A temperature sensor is thereby obtained which provides a linear indication of about 6 mV/° C, when the diodes are supplied with a constant current in the forward direction.

For heating the sensor 10 the base-emitter diode, driven in the reverse direction, of the fourth transistor can be utilized. Hereby break-down in the blocking direction of the diode is utilized, which means that the diode conducts current in the reverse direction with a constant voltage drop. Since this voltage in the reverse direction is hardly influenced by the temperature, it is possible to supply from a source of constant voltage, via a resistor, a constant current in the reverse direction of the diode and thereby obtain constant power in the sensor, independently of the ambient temperature.

In practice, the two sensors 8 and 10 may be comprised of two identical monolithic crystals of the type commercially referred to as a "transistor array" or integrated circuit monolithic. Other suitable crystals of similar or modified type are likewise suitable for the utilization of the present invention in practice.

The two temperature sensor signals can be supplied to a comparator amplifier with a relay output. The comparator amplifier can be infinitely adjustable to a required level, so that a certain flow velocity can be monitored by the system described above.

Figure 2:
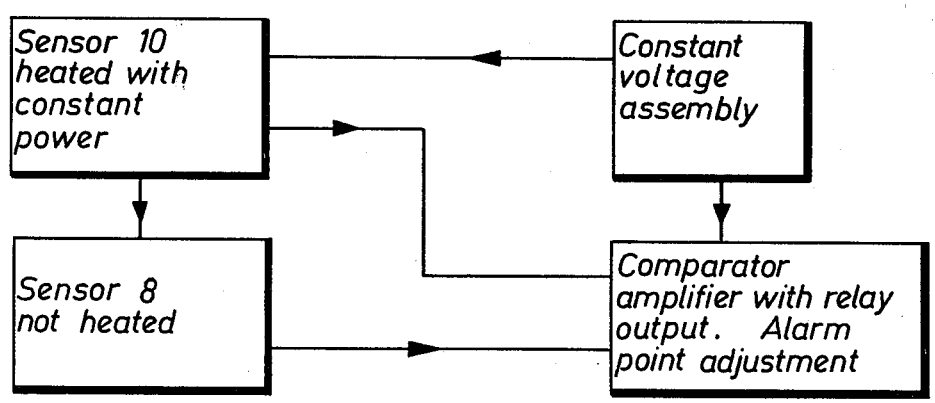
FIG. 2 is a block diagram of the device.

The block diagram of FIG. 2 schematically illustrates the described system.

Figure 3:
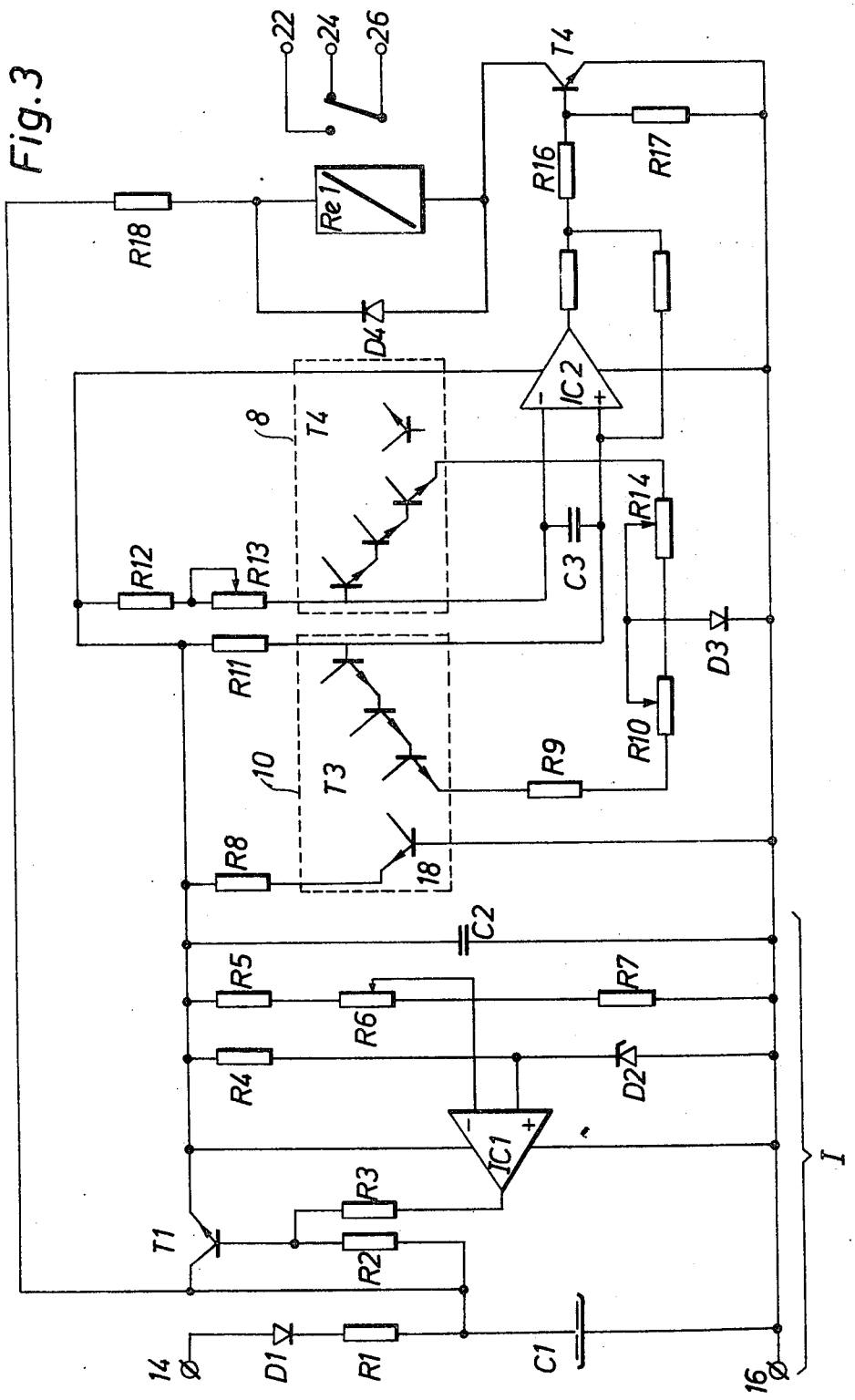
FIG. 3 is a schematic circuit diagram.

In FIG. 3 the circuit indicated I is comprised of a substantially conventional stabilized voltage supply assembly. The voltage supply assembly I comprises briefly an input series circuit, consisting of a diode D1, a resistor R1, and a capacitor C1, and connected over a pair of supply terminals 14 and 16. The junction point between R1 and C1 is connected to the collector of a transistor T1 and to the base of said transistor via a resistor R2. The base of the transistor T1 is connected via a resistor R3 to an output of an amplifier circuit IC1, which is supplied in the manner illustrated via the emitter-collector path of the transistor T1 and the supply terminal 16. One input of the amplifier IC1 is connected to the center point of a voltage divider, consisting of a resistor R4 and a Zener diode D2. The Zener diode D2 provides a reference level for the amplifier IC1.

The second input of the amplifier IC1 is connected to a voltage divider R5, R6, R7 between R6 and R7, wherein R6 comprises an adjustable resistor, by means of which the output voltage of the assembly is adjusted. The stabilized voltage supply assembly, finally, comprises a capacitor C2, which eliminates high frequency noise by filtering.

In addition, the circuit of FIG. 3 comprises the two sensors 8 and 10, which in the example illustrated each comprises four bipolar transistors T3 and T4, respectively, which are integrated on the same silicon wafer, the base emitter diodes of three of the transistors being series connected and serving as temperature sensing means. For heating the sensor 10 the base-emitter diode of the fourth transistor 18 is utilized by being series connected in the reverse direction with a resistor R8, a constant voltage from the voltage supply assembly I being obtained over said series circuit. Resistor R8 is a compensation and supply resistor, which is selected so that the voltage thereover will be equal to the voltage over the diode 18. Thereby compensation is obtained for the very small but inevitable temperature dependence of the diode voltage.

Resistors R11 and R12, R13 are supply resistors for the diode paths included in sensors 10 and 8, respectively, R13 being utilized for adjusting the voltage in the diodes comprised in sensor 8, so that the same voltage is obtained over the two diode paths. R9 is a resistor, which is dimensioned so as to compensate for the voltage difference between the two diode paths caused by the heating of the sensor 10. At the other end thereof two diode paths are connected via one adjustable resistor each R10 and R14, respectively, and a level determining diode D3 to the terminal 16 of the supply voltage assembly. R14 is an alarm point adjustment resistor, the operation of which is described below. R10 is adapted on one hand for fine adjustment in connection with the abovementioned compensation for the heating of the sensor 10 and, on the other hand, for compensating possible manufacturing tolerances between the two crystals 8 and 10. The voltage difference between the two initial points of the diode paths is adjusted to 0, when the tap of R14 is located to the far left. C3 represents the radiation shield 12 (FIG. 1) and is a combined noise suppressor and radiation shield between the two sensors 8 and 10.

The two diode paths in the sensors 8 and 10 are connected in the manner illustrated to one input each of a level discriminator IC2. The output of the level discriminator IC2 is connected via a resistor R16 to the base of a transistor T4, the collector-emitter path of which is series connected with the excitation winding of a relay Rel and a supply resistor R18, said series circuit thereby being supplied from the terminal 16 and the junction between the resistor R1 and the capacitor C1.

The level discriminator IC2 through the connection thereof to the base of the transistor T4 controls the state of conduction of said transistor and thereby the current supply to the relay Rel. At the output contacts 22–26 of the relay, current supply to e.g. an alarm device, not illustrated, is controlled, which may be of a conventional type and consequently need not be described more closely.

By matching the heating of sensor 10, the measuring current through the diode paths and the gain of the level discriminator IC2 in a suitable manner, a convenient adjustment arrangement is obtained, which allows adjustment of an alarm point or a nominal value by means of one control knob, i.e., the control of the resistor R14, independently of the temperature of the flowing fluid, and wherein the scale can be graded in per cent of a certain absolute value. The adjustment is performed as follows. For setting a minimum flow, and assuming that a nominal flow is present at the time of setting, the adjustment knob of R14 is turned from a minimum position toward a maximum, until an alarm is obtained. From this point the knob is turned towards the minimum position as many scale divisions as correspond to a permissible percentage of reduction of the flow before alarm.

For setting a maximum flow the initial point is the maximum position of the knob or R14 and the knob is then turned, until the alarm signal is obtained, whereafter the knob is turned towards maximum again a number of scale divisions corresponding to the permissible percentage of increase of the flow before alarm.

The scale preferably indicates the flow in per cent and is arranged so that the scale divisions are equally divided, each scale division being at 70% or 130% of the absolute value of the preceding scale division. The same resolution in per cent is thereby obtained throughout the scale. This division is based on the experience that it is often desirable to set the alarm point at 70% or 130%, respectively, or nominal flow.

An automatic change of alarm point at multi-speed blowers can be obtained by the provision of a plurality of resistances R14, adapted to one blower speed each. The putting into the circuit of a desired resistor R14 may then be controlled by a relay, not illustrated.

Instead of being used for controlling an alarm device, the signal from the device of the invention can also be provided in the form of a voltage or current for controlling a regulating device.

In practice a device according to the invention may have a measuring range of, e.g., 0.35 m/s to 8 m/s. By means of a time relay, not illustrated, an alarm delay can be obtained, e.g., of about 10 seconds, so as to eliminate disturbances from turbulence and the like of the fluid.

The device according to the invention has a wide range of applications and may be utilized, e.g., for monitoring the air quantity passing through filters, condenser batteries, electric heating installations or the like, and for controlling purposes or remote setting in connection with monitoring. It may also be combined with electronic programming means for multi-stage control of blowers or with control means for speed control.

In addition to the advantages, which are evident from the description above, it should be mentioned that the arrangement enables a very simple and safe setting and presents a rugged construction, which allows mounting in air channels or arbitrary extension.

What we claim is:

1. In a device for monitoring the flow velocity of a flowing fluid, comprising:

temperature sensing means adapted for location in said flowing fluid, means for supplying constant electrical power to said sensing means so as to obtain a constant temperature excess therein relative to ambient temperature, whereby a temperature reduction in said sensing means caused by said flowing fluid will be related to said flow velocity, the improvement wherein:

said sensing means comprises first and second essentially identical monolithic integrated circuits, each arranged in a respective heat conducting case, each of said integrated circuits comprising a crystal carrying a plurality of series connected integrated diodes forming a diode path and serving as a temperature sensor, both of said essentially identical crystals in addition including an integrated semiconductor heating member having a low temperature coefficient, said heat conducting cases being fastened to a sheet located in the flow path of the flowing with the plane of the sheet extending substantially in parallel to the flow direction of the flowing fluid and with said heat conducting cases located substantially in the same plane transverse to said flow direction, a radiation shield mounted on said sheet between said two heat conducting cases, said constant power supplying means includes means for supplying a substantially constant voltage to said heating member of only said first crystal and thereby developing substantially constant power in said first crystal over a large temperature range, means is provided for supplying current in the forward direction in said two diode paths, and a comparison circuit is connected to said two diode paths for comparing the forward-direction currents flowing respectively therein and producing a difference signal corresponding to the difference between said forward-direction currents, said difference signal representing the fluid flow velocity.

2. A device according to claim 1, wherein said heating member of said first crystal comprises a PN semiconductor diode junction having a Zener diode voltage-current characteristic, and electrical leads coupled to said PN junction for supplying electrical power thereto.

3. A device according to claim 1, wherein said heating member of said first crystal comprises a PN semiconductor diode junction having electrical leads coupled to said PN diode junction for supplying electrical power thereto.

4. A device according to claim 1, wherein said heating member of said first crystal comprises a PN semiconductor junction of a transistor, and electrical leads coupled to said PN transistor junction for supplying electrical power thereto.

5. A device according to claim 1, wherein the diode path of said first crystal is connected in series with a resistance for compensating the voltage difference between the diode paths caused by heating said first crystal by means of the power supply to said heating member.

6. A device according to claim 1, comprising setting means including a control means coupled in the diode current path of said second crystal for adjusting the current flow through the diode path in said second crystal, thereby setting a nominal value of the flow velocity for given values of the power supplied to said heating member of said first crystal, the current through said diode paths, and the gain of said comparison circuit.

7. A device according to claim 6, wherein the comparison circuit comprises a comparator amplifier and a relay coupled to the output thereof, said comparison circuit being adjustable to a desired level for monitoring a certain flow velocity.

8. A device according to claim 6 wherein said setting means comprises a variable resistance means connected in series with the diode current path of said second crystal.

9. A device according to claim 1 wherein each of said sensing means comprises at least three series connected diodes forming the respective diode paths and formed on the respective monolithic semiconductor crystals.

10. A device according to claim 1 wherein said diode paths comprise series connected base-emitter junctions of transistors, and wherein said heating member of said member comprises the base-emitter junction of a transistor.

* * * * *

UNITED STATES PATENT OFFICE
CERTIFICATE OF CORRECTION

PATENT NO. : 3,988,928
DATED : November 2, 1976
INVENTOR(S) : Lennard EDSTROM et al It is certified that error appears in the above-identified patent and that said Letters Patent are hereby corrected as shown below:

Column 5 (claim 1), line 53, after "flowing"

insert --fluid--;

Column 6 (claim 10), line 60, change "member"

to --first crystal--.

Signed and Sealed this

Twenty-second Day of February 1977

[SEAL]

Attest:

RUTH C. MASON
Attesting Officer

C. MARSHALL DANN
Commissioner of Patents and Trademarks